US012746576B2

(12) United States Patent
Lössl

(10) Patent No.: US 12,746,576 B2
(45) Date of Patent: Sep. 29, 2026

(54) VIBRATING SIEVE

(71) Applicant: Stefan Lössl, Lembach im Mühlkreis (AT)

(72) Inventor: Stefan Lössl, Lembach im Mühlkreis (AT)

( * ) Notice: Subject to any disclaimer, the term of this patent is extended or adjusted under 35 U.S.C. 154(b) by 0 days.

(21) Appl. No.: 19/100,174

(22) PCT Filed: Jun. 7, 2023

(86) PCT No.: PCT/AT2023/060181
§ 371 (c)(1),
(2) Date: Jan. 31, 2025

(87) PCT Pub. No.: WO2024/031111
PCT Pub. Date: Feb. 15, 2024

(65) Prior Publication Data

US 2026/0042119 A1 Feb. 12, 2026

(30) Foreign Application Priority Data

Aug. 9, 2022 (AT) ................................ A50610/2022

(51) Int. Cl.
*B07B 1/28* (2006.01)

(52) U.S. Cl.
CPC .................................... *B07B 1/284* (2013.01)

(58) Field of Classification Search
CPC .................................. B07B 1/284; B07B 1/46
USPC .... 209/366.5, 367, 370, 405, 408, 409, 412, 209/414
See application file for complete search history.

(56) References Cited

U.S. PATENT DOCUMENTS 2,256,358 A * 9/1941 Smith ...................... B07B 1/284 209/349
2,415,993 A * 2/1947 William .................. B07B 1/284 209/415
3,954,604 A * 5/1976 Krause ...................... B07B 1/36 209/325
5,337,901 A * 8/1994 Skaer ........................ B07B 1/28 209/314
7,111,739 B2 * 9/2006 Tsutsumi .................. B07B 1/40 209/254

(Continued)

FOREIGN PATENT DOCUMENTS

CN 113134468 A 7/2021
DE 1273309 B 7/1968

(Continued)

OTHER PUBLICATIONS

International Search Report and Written Opinion in International Application No. PCT/AT2023/060181, mailed Oct. 11, 2023, 20 pages.

*Primary Examiner* — Joseph C Rodriguez
(74) *Attorney, Agent, or Firm* — Liang & Hennessey LLP; Brian Hennessey

(57) ABSTRACT

A device including a vibrating screen and a motor for causing the vibrating screen to vibrate, wherein the vibrating screen is attached to a rigid frame, wherein the motor is rigidly attached to the frame and causes it to vibrate, wherein the angle between the plane of the vibrating screen and the mounting surface of the motor is in the range of 30 to 60 degrees and/or the legs of the device are attached to the frame.

19 Claims, 5 Drawing Sheets

(56) References Cited

U.S. PATENT DOCUMENTS

| | | | | |
|---|---|---|---|---|
| 7,673,755 | B2 * | 3/2010 | Gemmill | B07B 1/42<br>209/405 |
| 8,863,959 | B1 * | 10/2014 | Britton | B03B 4/02<br>209/11 |
| 2021/0354172 | A1 * | 11/2021 | Colgrove | B07B 1/4618 |
| 2021/0370351 | A1 | 12/2021 | Shaw | |

FOREIGN PATENT DOCUMENTS

| | | | |
|---|---|---|---|
| DE | 29708199 | U1 | 9/1997 |
| WO | 2008027525 | A2 | 3/2008 |

* cited by examiner

VIBRATING SIEVE

CROSS-REFERENCE TO RELATED APPLICATIONS

The present application is a national phase application of PCT Application No. PCT/AT2023/060181, filed Jun. 7, 2023, entitled “VIBRATING SIEVE”, which claims the benefit of Austrian Patent Application No. A50610/2022, filed Aug. 9, 2022, each of which is incorporated by reference in its entirety.

BACKGROUND OF THE INVENTION

1. Field of the Invention

The invention relates to a motorized vibrating screen.

2. Description of the Related Art

A motorized vibrating screen is a device for separating material, with fine particles falling through the vibrating screen and larger particles sliding down the sloping vibrating screen. The motor moves or vibrates the vibrating screen to assist in this process.

State-of-the-art motorized vibrating screens are usually relatively large and heavy devices that have a stable frame and a frame that is suspended from this frame or decoupled via springs and on which the vibrating screen is located. Such a structure is necessary so that the vibrating screen is set into vibration, but not the entire device.

Such a vibrating screen is known, for example, from DE1273309B.

SUMMARY OF THE INVENTION

The object underlying the invention is to create an improved, in particular small, compact motorized vibrating screen.

To solve the problem, many attempts were made and prototypes were developed, the difficulty being to create a small device whose vibrating screen can be set in vibration and at the same time has a stable stand on different surfaces.

In one embodiment, a device is proposed, comprising a vibrating screen and a motor for causing the vibrating screen to vibrate, wherein the vibrating screen is attached to a rigid frame, wherein the legs of the device are attached to the frame and the motor is rigidly connected to the frame and causes it to vibrate.

In one embodiment, a device is proposed, comprising a vibrating screen and a motor for causing the vibrating screen to vibrate, wherein the vibrating screen is attached to a rigid frame, wherein the motor is attached to a mounting surface which is rigidly attached to the frame and the motor causes the frame to vibrate, wherein the mounting surface of the motor is inclined to the plane of the vibrating screen, wherein the angle between the plane of the vibrating screen and the mounting surface of the motor is in the range of 30 to 60 degrees. The angle is preferably between 35 and 55 degrees, in particular between 40 and 50 degrees. In one embodiment, the angle is 45 degrees. The angle is enclosed between the underside of the vibrating screen and the area of the mounting surface below the vibrating screen.

Preferably, the features of both mentioned embodiments are implemented in one device.

The vibrating screen is preferably used for sieving compost.

It is preferred that the frame comprises a rear wall, with a mounting bracket behind the rear wall, on the mounting surface of which the motor is located, with the mounting surface being inclined to the plane of the vibrating screen and inclined to the rear wall.

It is preferred that the motor is an unbalanced motor. The shaft of the unbalanced motor is preferably aligned parallel to the rear, upper edge of the vibrating screen. In other words, the shaft of the unbalanced motor is arranged along the broad side of the device. The unbalanced motor is preferably a double-shaft motor, with the two unbalanced weights preferably being arranged symmetrical around the center of the device.

It is preferred that the frame comprises a frame-shaped base element on which the vibrating screen rests and to which it is fastened.

It is preferred that on both sides of the outer longitudinal edges of the base element side walls protrude, which are connected at the rear side of the base element by a rear wall which protrudes from the rear, outer edge of the base element.

It is preferred that a wing or section projects downwards from each of the inner edges of the base element.

It is preferred that the frame is composed of four profile elements which together form the base element, wherein the profile elements are welded in their joint areas.

It is preferred that the device comprises four fastening elements for the legs, wherein the legs are pivotally mounted in the fastening elements.

It is preferred that each leg comprises a base which is an elastic element and has a downwardly tapering shape.

It is preferred that one pair of legs is located further to the outside than the other pair of legs, the inner pair of legs resting against the underside of the frame when folded in and the outer pair of legs being located next to the side walls of the frame when folded in, with a stop angle is protruding from each side of the frame, against which one of the two outer legs rests.

It is preferred that the motor is attached to the mounting surface by means of fastening means in the form of screws or bolts, wherein the plane of the vibrating screen crosses the plane of the mounting surface in the region between an upper and a lower fastening means.

The present motorized vibrating screen differs from the state of the art in that the frame on which the vibrating screen is mounted is directly provided with four legs. The vibrating screen is firmly connected to the frame, in particular screwed. A motor is attached to the frame, which causes the frame and, via this, the vibrating screen to vibrate.

The direct attachment of the legs to the frame refers to the fact that the attachment point of the legs is on the frame and the frame is therefore not arranged on a second frame or another frame which has legs, as in the prior art mentioned at the beginning.

In one embodiment, the legs can be rigidly connected to the frame so that the vibration of the frame is transferred to the legs. In another embodiment, a spring or a damper element can be present at the attachment point of the respective leg in order to reduce or prevent the transmission of the vibration to the legs. Another embodiment is to make a section of the respective leg, for example the uppermost area or a middle area, out of elastic material or as a spring.

The device stands on the ground with its four legs. The vibrating screen is not mechanically decoupled from the frame. The frame is preferably not mechanically decoupled from the legs. The vibration of the motor is thus transferred to the entire device, with elastic feet on the legs ensuring that the vibration is dampened relative to the ground. The elastic feet and their angled alignment relative to the ground ensure that the vibrating screen does not move even on a hard surface such as a concrete floor.

The frame is preferably made up of several elements that are rigidly welded together.

The frame comprises a rectangular, frame-shaped base element, which has a wall on the rear end and on both long sides, with the respective wall projecting upwards at the outer edge of the frame-shaped base element. The walls preferably project upwards at a right angle from the base element.

The vibrating screen rests directly on the base element and is firmly connected to it, in particular by means of screws. If it is not desired that the vibrating screen can be exchanged, it can also be welded to the frame, for example by spot welding.

The frame has a fastening element for each leg in each corner area. The legs are preferably pivotally mounted in the fastening elements. If folding is not desired, the legs can be welded or firmly screwed to the frame or fastening elements. However, folding the device is preferred in any case.

Each leg is preferably a hollow tube, in particular a rectangular tube or a square tube.

Each leg preferably has a base or foot made of elastic material at its lower end. The bases preferably have a cross-section that tapers downwards.

One pair of legs, preferably the front one, is preferably located further to the inside than the other pair. The pair located further to the inside preferably rests on the underside of the base element when folded in. The pair located further to the outside preferably rests on stops when folded in, which protrude outwards from each side wall of the frame.

The two front legs are preferably shorter than the rear legs and/or have a larger angle to the base element. This creates a slope from the rear end to the front end of the vibrating screen. The angle between the inside of the respective leg and the ground when viewed from the side is preferably less than 90 degrees.

In addition, there is preferably a mounting bracket at the rear wall, to which a motor is attached. The angle between the vibrating screen and the mounting surface of the motor is preferably in the range of 30-60 degrees. The mounting surface of the motor is particularly preferably at an angle of 45 degrees to the vibrating screen. The mounting bracket is preferably welded to the frame.

The motor is preferably a state-of-the-art external vibrator (also referred to as a vibration motor or unbalance motor).

The vibrating screen is preferably a perforated sheet metal. The size of the holes is preferably in the range of 10-20 mm. The perforated sheet preferably has a thickness in the range of 1.5 mm to 2.5 mm, in particular 2 mm. The vibrating screen is preferably a galvanized steel sheet. A perforated sheet is preferred over a grid because the flat sheet rests better on the frame and is easier to be fixed by screws.

The angle of inclination of the vibrating screen when the device is set up level is preferably between 10 and 30 degrees, in particular between 15 and 20 degrees.

The vibrating screen is preferably attached to the base element of the frame with three screws along each of both long sides.

The base element forms a circumferential support surface for the vibrating screen and preferably has a large opening within this support surface, in particular a rectangular opening. Preferably, no cross struts or longitudinal struts run between the frame elements below the vibrating screen.

BRIEF DESCRIPTION OF THE DRAWINGS

The invention is illustrated by a preferred, but not restrictive, embodiment shown in the drawings.

DETAILED DESCRIPTION

Figure 1:
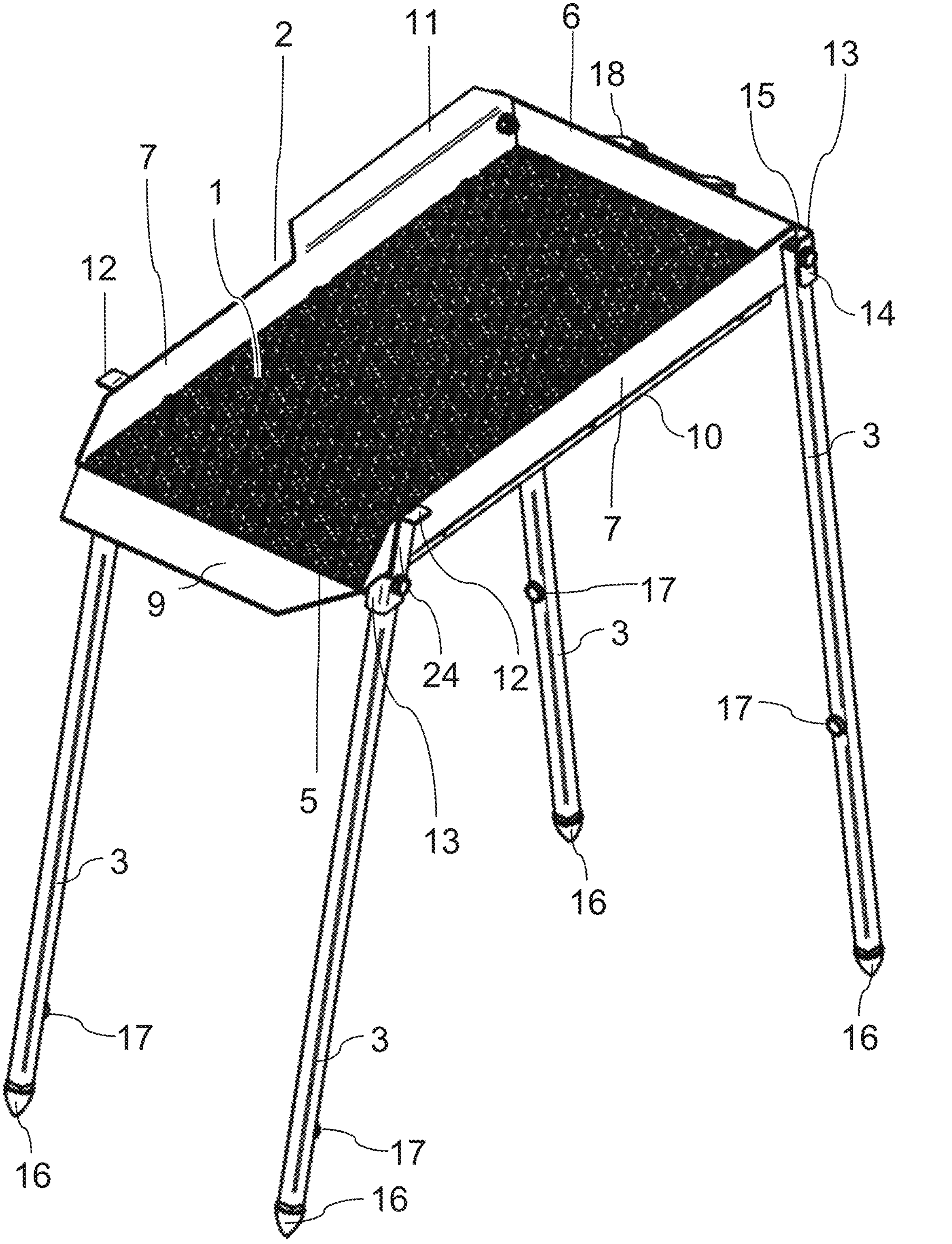
FIG. 1 Shows a perspective view of a particularly preferred embodiment of the device.

FIGS. 1-3 and 5 show the particularly preferred embodiment of the device. The device in FIG. 4 differs from this only in that the upper wings 11 extend to the front end of the side walls 7. The other components are identical to one another in both embodiments. The following description of the figures therefore applies to all FIGS. 1-5.

The present motorized vibrating device differs from the prior art in that the frame 2, on which the vibrating screen 1 is mounted, is directly provided with four legs 3. The vibrating screen 1 is firmly connected to the frame 2, in particular screwed. A motor 4 is attached to the frame 2, which causes the frame 2 and, via this, the vibrating screen 1 to vibrate.

The frame 2 comprises a rectangular, frame-shaped base element 5, which has a rear wall 6 on the rear end face and a side wall 7 on each of the two long sides, with the respective wall 6, 7 projecting upwards at the outer edge of the frame-shaped base element 5. The walls 6, 7 preferably project upwards at a right angle from the base element 5.

At the rear end of the frame 2, a downwardly and inwardly inclined section 8 can be connected to the inner edge of the base element 5.

At the front end, the base element 5 is extended forwards to form a slide plate 9 for material coming from the vibrating screen 1. The slide plate 9 is preferably in a straight extension of the vibrating screen 1, i.e. with the same inclination.

On the front face of the frame 2, a downwardly and inwardly inclined region 20 can be connected to the inner edge of the base element 5. This region 20 can be seen in FIG. 5, which includes a side view of the front frame element.

On the inside of the two long sides of the base element 5, downward-directed wings 10 can protrude, preferably at right angles. As used herein, “wing” refers to “a section of sheet metal”, as a translation of the German word “Schenkel”.

In the rear area of the two side walls 7 there are preferably upper wings 11 which point obliquely outwards and upwards. The upper wings 11 can start from the rear wall 6 and run forwards to approximately the middle of the side walls 7. In the front area of the side walls 7 there are outward-projecting stop angles 12 for the rear legs 3 of the device. The stop angles 12 can be integrally connected to the side walls 7, or welded or screwed to them. The stop angles 12 can be present at the upper end of fastening elements 13 of the front legs 3. At the front end the side walls 7 are designed to rise, in particular rise at an angle, starting from the base element 5.

The fastening elements 13 of the four legs 3 are in the form of U-shaped profiles. The U-shaped profiles for the rear legs 3 are preferably formed by the side walls 7 and the rear wall 6 of the frame 2. The rear wall 6 projects outwards beyond the two side walls 7 and has a forward-projecting side section 14 at the outer end. The base 15 of each U-shaped profile forms a stop for a leg 3 in the unfolded state. The pivot axis of the respective leg 3 runs between the two sides of the U-shaped profile. The base 15 of the rear U-shaped profiles is preferably perpendicular to the plane of the base element 5. The angle, located on the inside and underside, between the base 15 of the front U-shaped profiles and the plane of the base element 5 is preferably more than 90 degrees, in particular between 100 and 120 degrees, for example 110 degrees.

Figure 5:
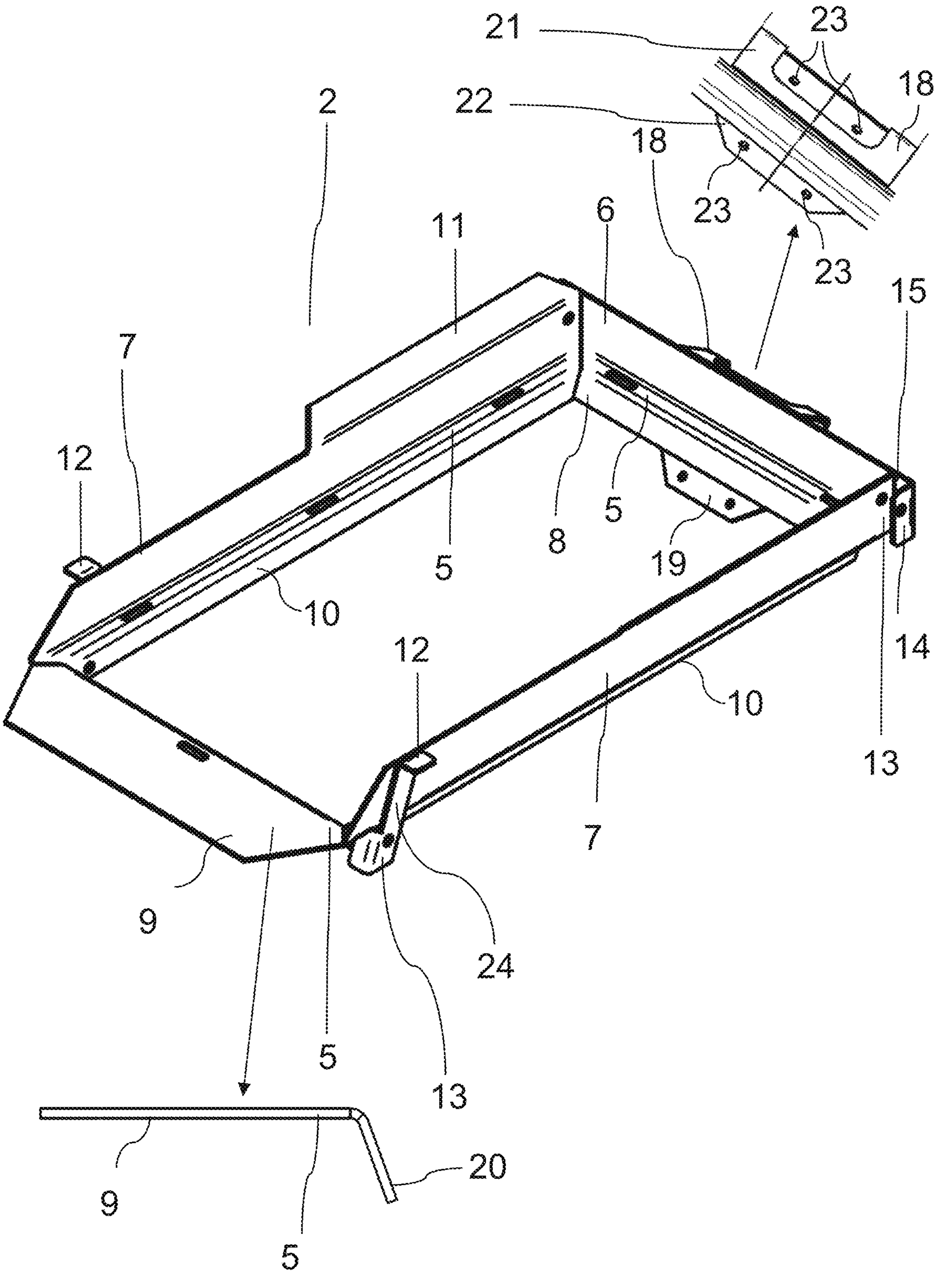
FIG. 5 Shows the particularly preferred structure of the frame of the device.

The preferred composition or manufacture of the frame 2 can be seen in FIG. 5. The frame 2 is preferably composed of one element, in particular a sheet metal element, on each side of the rectangular frame 2. The frame 2 comprises a front frame element, which comprises the sliding plate 9 and the inward and downward inclined region 20, wherein a part of the sliding plate 9 forms the front side of the base element 5. Less preferably, the sliding plate 9 could have an angle or bend to the base element 5. The sliding plate 9 is preferably designed to taper towards the front. The frame 2 comprises a rear frame element, which comprises the back of the base element 5 and the rear wall 6, as well as the inward and downward inclined section 8. The base 15 and the side section 14 of the fastening element 13 are also preferably formed from the rear frame element. Less preferably, the fastening element 13 or the base 15 and the side section 14 can be present as a separate element and can be fastened to the frame 2, in particular welded.

The mounting bracket 18 is attached, in particular welded, to the rear frame element. Preferably, there is a weld seam between the upper edge of the mounting bracket 18 and the rear wall 6. Preferably, there is a weld seam between the lower edge of the section 8 and the mounting surface 19. The mounting surface 19 preferably projects downwards beyond the section 8. The mounting surface 19 can rest on the outside at the corner area of the base element 5 and the rear wall 6. Welding in this area is not necessary, but could be carried out in particular in the respective side areas of the mounting surface 19.

The mounting bracket is preferably an L-shaped bracket which comprises an upper leg 21 and a lower leg 22, which lower leg 22 forms the mounting surface 19.

In FIG. 5, the mounting bracket 18 is also shown in a view from above, in which can be seen that it has a central recess, so that two through openings 23 on the mounting surface 19 are accessible through the opening of the upper leg 21 of the mounting bracket 18. The recess preferably extends over a partial area of the upper leg 21 and lower leg 22. Two further through openings 23 are present on the mounting surface 19 below the section 8. The motor 4 is fastened to the mounting surface 19 with bolts or screws and nuts, with the bolts or screws protruding through the through openings 23.

The plane of the vibrating screen 1 crosses the plane of the mounting surface preferably in the area between the lower and upper through openings 23. In other words, the plane of the vibrating screen 1 crosses the plane of the mounting surface 19 in the area between an upper and a lower fastening means, in the form of screws or bolts.

The mounting surface 19 is located behind the rear end of the vibrating screen 1, whereby the mounting surface 19 is partially below the plane (straight extension of the vibrating screen in the direction of the mounting surface) of the vibrating screen 1 and partially above the plane of the vibrating screen 1.

The frame 2 preferably comprises two lateral frame elements, each of which forms a lateral region of the base element 5 and also comprises the lower wings 10. The upper wings 11 can be part of the lateral frame elements or can be welded or screwed to them.

The frame elements are welded together in their joint areas. The four frame elements together form the flat base element 5 on which the vibrating screen 1 rests and is firmly screwed. The frame elements have a preferred material thickness in the range of 2-4 mm, in particular 3 mm.

The fastening element 13 (or parts of the fastening element 13) of the respective front leg 3 is preferably welded to the side frame element. The welded part preferably comprises a flat element 24 which rests on the outside of the side wall 7 and forms a side section of the U-profile in the lower area, below the base element 5. A further section protrudes inwards from this lower area and forms the base 15 of the U-profile. The second side section of the U-profile is preferably formed by the lower wing 10. The two side sections of each fastening element 13 each have an opening, so that a bolt guided through the two openings forms the pivot axis for the legs 3. At the upper end of the flat element 24, the welded part preferably comprises the stop angle 12.

The fastening elements 13 and the axes arranged in the fastening elements 13 are preferably made of rigid material. Less preferably, these elements can be designed to be elastic or vibration-damping, or to have elastic or vibration-damping supports or coatings. For example, a vibration-damping element made of rubber or foam could be present in the U-profile between the fastening element 13 and the leg 3. In one embodiment, the respective leg 3 is pre-tensioned against the base 15 of the U-profile.

In one embodiment, the respective joint between the frame 2 and a leg 3 is designed to be stiff, so that the vibration of the frame 2 does not cause the leg 3 to move around the joint. The leg 3 can be held in place in particular by a clamping effect or friction between the two legs of the respective fastening element 13.

Each leg 3 is preferably a hollow tube, in particular a rectangular tube or a square tube.

Each leg 3 has a foot or base 16 made of elastic material at its lower end. The bases 16 preferably have a cross-section that tapers downwards.

In particular, the bases 16 are conical or pyramid-shaped or conical with flattened tips. The bases 16 can in particular be in the form of rubber buffers. The bases 16 can be in the form of parabolic rubber-metal buffers (parabolic springs), which are used according to the state of the art for impact protection or impact damping. The bases 16 can be provided with threaded bolts and can be screwed into the legs 3. The height of the bases 16 is preferably between 20 and 65 mm, in particular between 25 and 40 mm. The diameter of the bases 16 is preferably between 20 and 50 mm, in particular between 25 and 40 mm. The Shore hardness is preferably in the range of 30-90° Shore A, in particular 40-70° Shore A, in particular 50 to 60° Shore A.

Magnets 17 can be attached to the legs 3 to hold them to the frame 2 when folded in.

One pair of legs 3, preferably the front one, is preferably located further inward than the other pair. The pair further inward preferably rests on the underside of the base element 5 when folded in. The pair further outward preferably rests on a stop 12 when folded in, which protrudes outward from a side wall 7 of the frame 2. The two inner legs 3 can be connected by a cross brace. The two front legs 3 are preferably shorter than the rear legs 3 and/or have a larger angle to the base element 5. This creates a slope from the rear end to the front end of the vibrating screen 1. The angle between the inside of the respective leg 3 and the ground when viewed from the side is preferably less than 90 degrees, in particular it is in the range of 75 to 85 degrees.

In addition, there is preferably a mounting bracket 18 on the rear wall, to which a motor 4 is attached. The angle between the vibrating screen 1 and the mounting surface 19 of the motor 4 is preferably in the range of 30-60 degrees. The mounting surface 19 of the motor 4 is particularly preferably at an angle of 45 degrees to the vibrating screen 1. The mounting bracket 18 is preferably welded to the frame 2.

The motor 4 is preferably an external vibrator known from the state of the art. An external vibrator is understood to be a motor 4 which does not have an outwardly projecting shaft, but rather transmits a vibration or oscillation to the element on which the motor 4 is mounted due to its own imbalance. The motor preferably allows for adjusting the centrifugal force in order to adapt the vibrator to the vibrating screen 1. A sinusoidal centrifugal force is preferably generated by the rotation of unbalanced weights. The MVE 41/3E-MICRO-M motor from OLI S.p.A. has proven to be suitable.

The motor 4 can be provided with a power cable. Battery operation is also conceivable.

The vibrating screen 1 is preferably a perforated sheet metal. The diameter of the holes is preferably in the range of 8-20 mm. The hole spacing (from center to center) is preferably in the range of 1.3 to 1.6 times the hole diameter, in particular in the range of 1.4-1.5 times. The device is preferably provided with two types of vibrating screens 1 that can be mounted on the frame 2 and which differ in the hole diameter. One preferably has a hole diameter of 10 mm and the other of 15 mm.

The length of the vibrating screen 1 is preferably in the range of 650-750 mm, in particular in the range of 670 to 710 mm. The width of the vibrating screen 1 is preferably in the range of 350-450 mm, in particular in the range of 370 to 410 mm.

The perforated sheet preferably has a thickness in the range of 1 mm to 3 mm, in particular 1.5-2.5 mm, in particular 2 mm.

The vibrating screen 1 is preferably attached to the base element 5 along both long sides with three screws each. There can also be a central screw on the front face, with which the vibrating screen 1 is attached to the base element 5. On the rear side of the base element 5 there are preferably two outer screws, on both sides next to the mounting bracket 18. The base element 5 preferably has an elongated hole for each screw, as can be seen in FIG. 5. Each screw is guided through a suitable hole in the vibrating screen 1, which is designed as a perforated plate, and one elongated hole and tightened with a nut.

The legs 3 are preferably not telescopic legs, although the provision of such is not excluded.

The lateral distance of the legs 3 is preferably large enough to be able to place a wheelbarrow underneath the vibrating screen 1.

Figure 2:
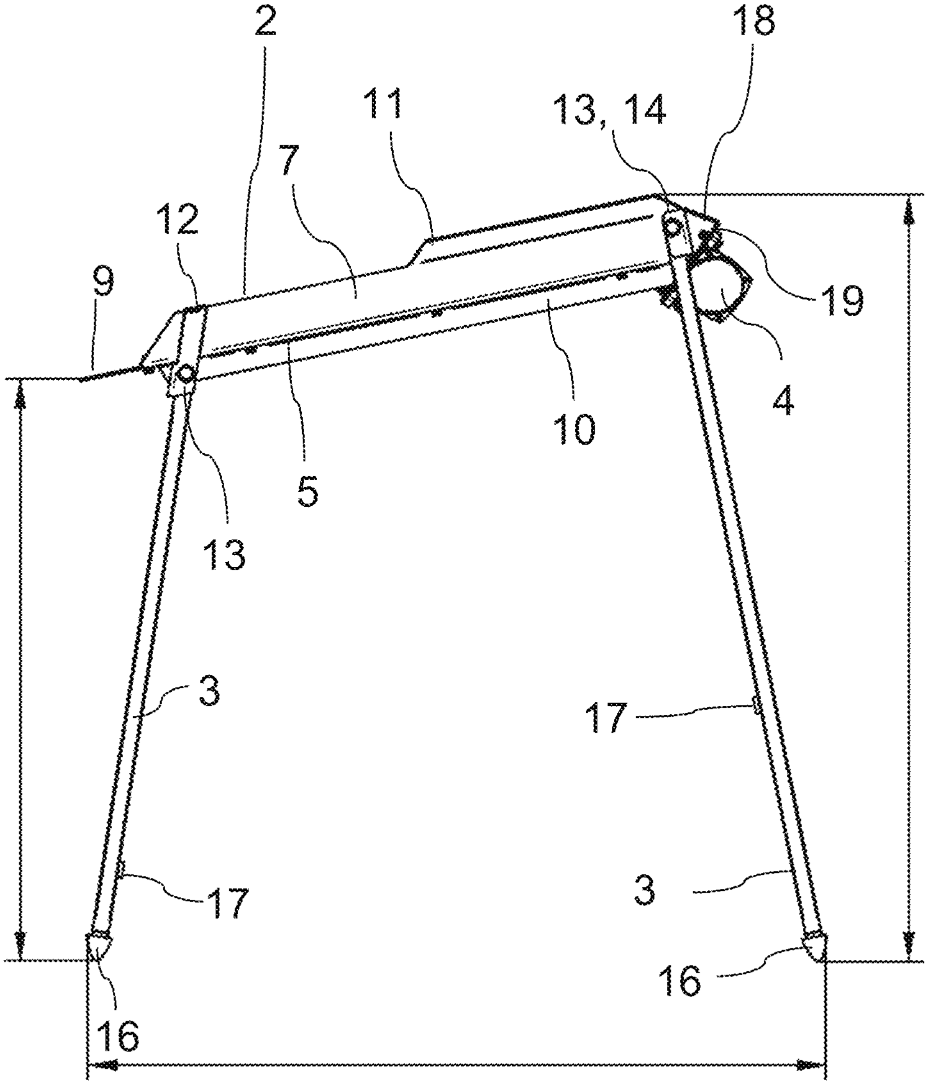
FIG. 2 Shows the particularly preferred embodiment of the device in side view.
Figure 3:
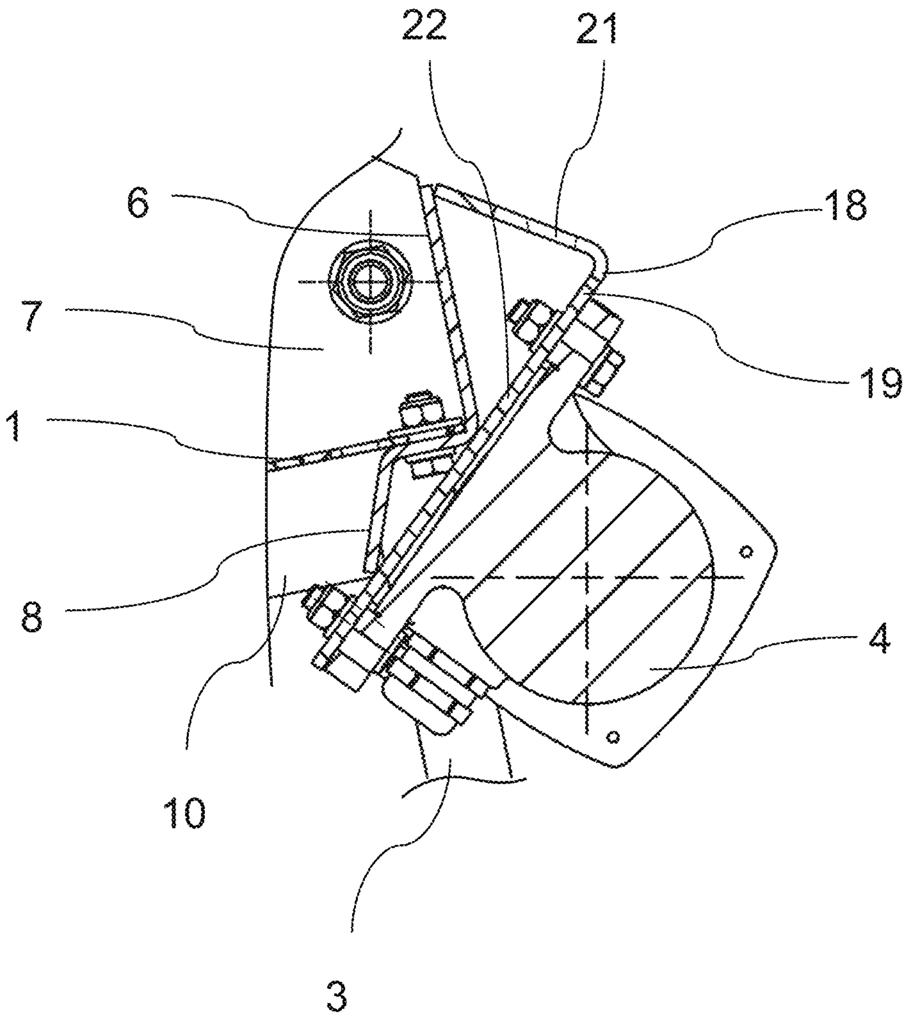
FIG. 3 Shows a section through the motor and its mounting location on the device.

In FIG. 2, a front height of the device is shown by a dimension line, whereby this distance from the ground to the front edge of the sliding plate is preferably 700-750 mm. A rear height of the device, which corresponds to the distance from the ground to the highest point of the upper wings 11, is preferably between 900 and 1000 mm. The distance shown between the rear and front legs is preferably between 800 and 1000 mm.

Figure 4:
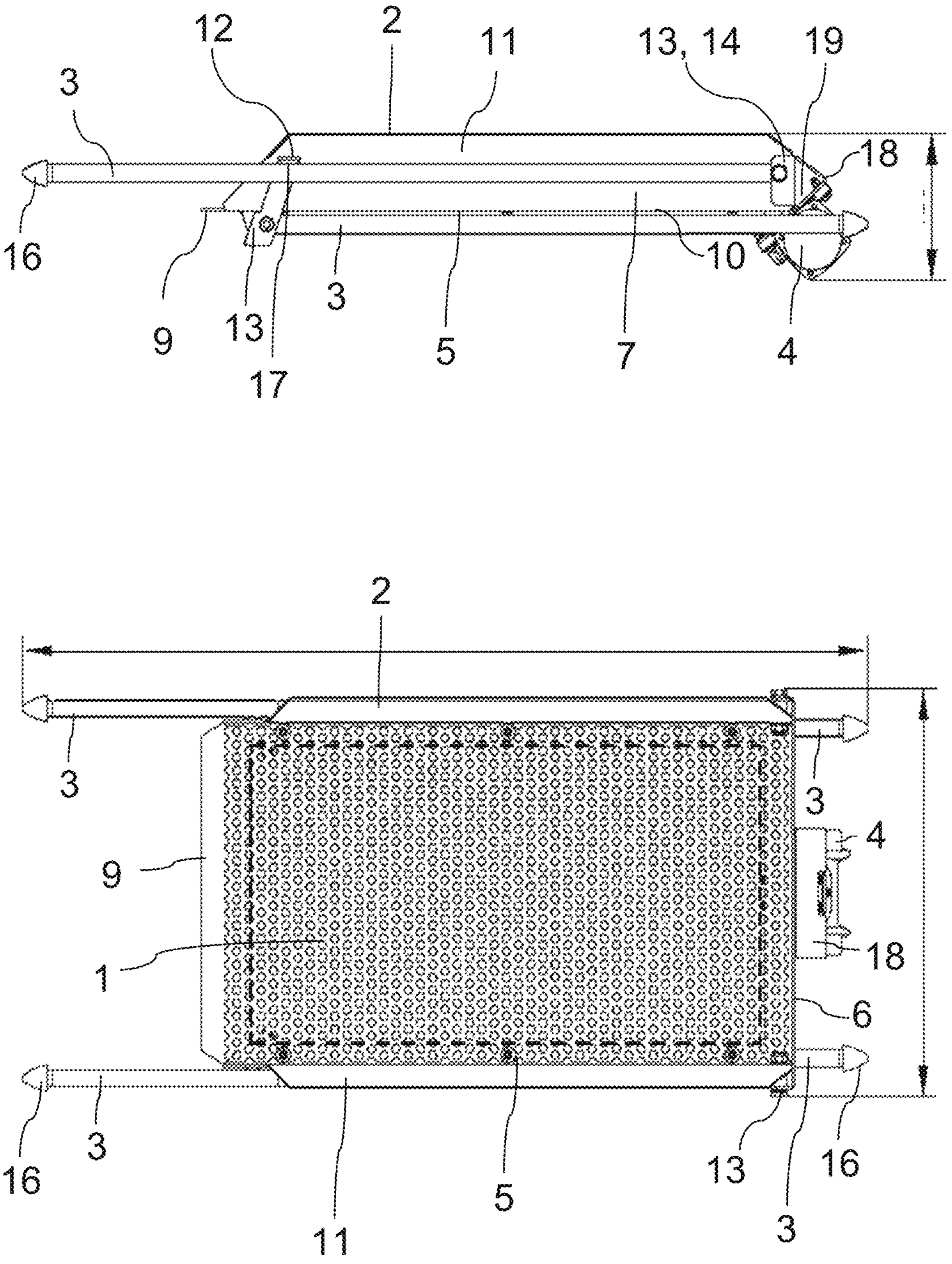
FIG. 4 Shows the folded device using a slightly different embodiment.

The width of the device shown in FIG. 4 is preferably between 400 and 500 mm. The folded length of the device shown in FIG. 4 (distance between the tips of the feet 16) is preferably between 900 and 1100 mm. The folded height of the device shown in FIG. 4 (distance between the lower edge of the motor 4 and the upper edge of the upper wing 11) is preferably between 150 and 200 mm.

The invention claimed is:

1. A device comprising:

a vibrating screen; and a motor for causing the vibrating screen to vibrate;

wherein the vibrating screen is attached to a rigid frame, legs of the device are attached to the frame, and the motor is rigidly attached to the frame and configured to cause the frame to vibrate;

wherein the frame comprises a frame-shaped base element on which the vibrating screen rests, the vibrating screen being fastened to the frame-shaped base element; and wherein side walls protrude on both sides of the outer longitudinal edges of the base element, the side walls being connected at the rear side of the base element by a rear wall which protrudes from a rear, outer edge of the base element.

2. The device according to claim 1, wherein:

behind the rear wall there is a mounting bracket, on the mounting surface of which the motor is located; and the mounting surface is arranged oblique to a plane of the vibrating screen and oblique to the rear wall.

3. The device according to claim 1, wherein the motor is an unbalance motor.

4. The device according to claim 1, wherein one of a lower wing and a section projects downwards from each of the inner edges of the base element.

5. The device according to claim 1, wherein:

the frame comprises four profile elements which together form the base element; and the profile elements are welded in joint areas of the profile elements.

6. A device comprising:

a vibrating screen; and a motor for causing the vibrating screen to vibrate;

wherein the vibrating screen is attached to a rigid frame, legs of the device are attached to the frame, and the motor is rigidly attached to the frame and configured to cause the frame to vibrate;

further comprising four fastening elements for the legs;

wherein the legs are pivotally mounted in the fastening elements.

7. A device comprising:

a vibrating screen; and a motor for causing the vibrating screen to vibrate;

wherein the vibrating screen is attached to a rigid frame, legs of the device are attached to the frame, and the motor is rigidly attached to the frame and configured to cause the frame to vibrate; and wherein each leg has a base which is an elastic element and has a downwardly tapering shape.

8. The device according to claim 6, wherein:

a first pair of the legs is located further outside than a second pair of the legs;

the second pair of legs rest on an underside of the frame in a folded-in state and the first pair of legs being located next to side walls of the frame in a folded-in state; and a stop angle protrudes laterally from the frame, one of the first pair legs resting against the stop angle.

9. A device comprising:

a vibrating screen; and a motor for causing the vibrating screen to vibrate;

wherein the vibrating screen is fastened to a rigid frame, the motor is fastened to a mounting surface which is rigidly attached to the frame, the motor configured to cause the frame to vibrate, the mounting surface of the motor is inclined to a plane of the vibrating screen, an angle between the plane of the vibrating screen and the mounting surface of the motor is in a range of 30 to 60 degrees;

wherein the motor is fastened to the mounting surface by fastening means in a form of one of screws and bolts; and wherein the plane of the vibrating screen crosses a further plane of the mounting surface in a region between an upper and a lower fastening means.

10. The device according to claim 9, wherein the mounting surface of the motor is at an angle of 45 degrees to the vibrating screen.

11. The device according to claim 9, wherein:

the frame comprises a rear wall;

behind the rear wall there is a mounting bracket, on the mounting surface of which the motor is located; and the mounting surface is inclined to the plane of the vibrating screen and inclined to the rear wall.

12. The device according to claim 9, wherein the motor is an unbalance motor.

13. The device according to claim 1, comprising:

four fastening elements for the legs;

wherein the legs are pivotally mounted in the fastening elements.

14. The device according to claim 6, wherein the frame comprises a frame-shaped base element on which the vibrating screen rests, the vibrating screen being fastened to the frame-shaped base element.

15. The device according to claim 6, wherein each leg has a base which is an elastic element and has a downwardly tapering shape.

16. The device according to claim 6, wherein:

the frame comprises a frame-shaped base element on which the vibrating screen rests, the vibrating screen being fastened to the frame-shaped base element; and side walls protrude on both sides of the outer longitudinal edges of the base element, the side walls being connected at the rear side of the base element by a rear wall which protrudes from a rear, outer edge of the base element.

17. The device according to claim 7, further comprising:

four fastening elements for the legs;

wherein the legs are pivotally mounted in the fastening elements.

18. The device according to claim 7, wherein:

the frame comprises a frame-shaped base element on which the vibrating screen rests, the vibrating screen being fastened to the frame-shaped base element; and side walls protrude on both sides of the outer longitudinal edges of the base element, the side walls being connected at the rear side of the base element by a rear wall which protrudes from a rear, outer edge of the base element.

19. The device according to claim 9, wherein:

the frame comprises a frame-shaped base element on which the vibrating screen rests, the vibrating screen being fastened to the frame-shaped base element; and side walls protrude on both sides of the outer longitudinal edges of the base element, the side walls being connected at the rear side of the base element by a rear wall which protrudes from a rear, outer edge of the base element.

* * * * *